(12) United States Patent
Hsieh

(10) Patent No.: US 11,289,801 B2
(45) Date of Patent: Mar. 29, 2022

(54) WIRELESS ACCESS POINT DEVICE

(71) Applicant: ACCTON TECHNOLOGY CORPORATION, Hsinchu (TW)

(72) Inventor: Chih-Chang Hsieh, Hsinchu (TW)

(73) Assignee: Accion Technology Corporation, Hsinchu (TW)

( * ) Notice: Subject to any disclaimer, the term of this patent is extended or adjusted under 35 U.S.C. 154(b) by 0 days.

(21) Appl. No.: 17/148,519

(22) Filed: Jan. 13, 2021

(65) Prior Publication Data
US 2021/0242573 A1    Aug. 5, 2021

(30) Foreign Application Priority Data
Jan. 31, 2020  (TW) .................................. 109201170

(51) Int. Cl.
| | |
|---|---|
| *H01Q 19/18* | (2006.01) |
| *H04W 88/08* | (2009.01) |
| *H01Q 1/24* | (2006.01) |
| *H01Q 15/16* | (2006.01) |
| *H01Q 1/12* | (2006.01) |
| *H01Q 19/15* | (2006.01) |

(52) U.S. Cl.
CPC .......... *H01Q 1/246* (2013.01); *H01Q 1/1228* (2013.01); *H01Q 15/16* (2013.01); *H01Q 19/15* (2013.01); *H04W 88/08* (2013.01)

(58) Field of Classification Search
CPC ...... H01Q 1/1228; H01Q 1/246; H01Q 19/15; H01Q 19/18; H01Q 19/19; H01Q 19/191; H04W 88/08
See application file for complete search history.

(56) References Cited

U.S. PATENT DOCUMENTS

| | | | |
|---|---|---|---|
| 9,742,069 B1 * | 8/2017 | Hollenbeck | H01Q 19/13 |
| 10,826,165 B1 * | 11/2020 | Deju | H05K 5/069 |
| 2014/0152492 A1 * | 6/2014 | Zimmerman | H01Q 1/08 342/352 |

* cited by examiner

*Primary Examiner* — Blane J Jackson
(74) *Attorney, Agent, or Firm* — CKC & Partners Co., LLC

(57) ABSTRACT

A wireless access point device includes a main frame, a transmission assembly, an antenna module and a fixing assembly. The main frame includes a casing and a first connection portion connected to the casing. The transmission assembly is disposed in an internal space of the casing and provided with a signal transceiving element. The antenna module includes a waveguide, a second connection portion and a positioning recess. The second connection portion is disposed on the waveguide and detachably connected to the first connection portion to be coupled to the signal transceiving element. The positioning recess is formed on the second connection portion. The fixing assembly is movably disposed on the first connection portion. The antenna module is thereby fixed on the casing, when the second connection portion and the first connection portion are fixed through the fixing assembly removably inserting into the positioning recess.

18 Claims, 7 Drawing Sheets

WIRELESS ACCESS POINT DEVICE

CROSS-REFERENCE TO RELATED APPLICATION

This application claims priority to Taiwan Application Serial Number 109201170, filed on Jan. 31, 2020, which is herein incorporated by reference.

BACKGROUND

Technical Field

The present disclosure relates to a wireless access point device. More particularly, the present disclosure relates to a wireless access point device capable of quickly releasing antenna module.

Description of Related Art

In recent years, Millimeter-wave (mmWave) technology of wireless transmission communication (e.g., 5th generation communication) has been developed aggressively, and researches on antenna modules for relevant wireless access points have been encouraged. Generally, an antenna module is usually installed on a higher place (e.g., eave or ceiling) or in a narrow position and fixed with a screwing fashion.

However, when disassembling, installing or replacing an antenna module from/to wireless access point, an operator needs to work with a screwdriver or a wrench.

Therefore, the conventional way may lead a complicated operation and slow progress in assembly/disassembly. In further, it would increase the risk that the worker or tool may fall from higher place.

SUMMARY

The present disclosure is to provide a wireless access point device to solve the aforementioned problems of the prior art.

In one embodiment of the disclosure, the wireless access point device includes a main frame, a transmission assembly, an antenna module and a fixing assembly. The main frame includes a casing having an internal space, and a first connection portion connected to the casing and communicated with the internal space. The transmission assembly is disposed in the internal space and provided with a signal transceiving element. The antenna module includes a waveguide, a second connection portion and a positioning recess. The second connection portion is disposed on one end of the waveguide. The second connection portion is detachably connected to the first connection portion to be coupled to the signal transceiving element. The positioning recess is formed on the second connection portion. The fixing assembly is movably disposed on the first connection portion. When the second connection portion and the first connection portion are fixed through the fixing assembly removably inserting into the positioning recess, the antenna module is thereby fixed on the casing.

According to one or more embodiments of the disclosure, in the foregoing wireless access point device, the first connection portion includes a slot. The slot is capable of being inserted by the second connection portion, and the slot is communicated with the internal space.

According to one or more embodiments of the disclosure, in the foregoing wireless access point device, the first connection portion includes a post and a through hole. The post is protrudingly formed on an outer surface of the casing, and the slot is formed on one end of the post facing away from the casing. The through hole is formed on one side of the post and communicated with the slot. Thus, an longitudinal direction of the through hole intersects a longitudinal direction of the slot, and the fixing assembly is inserted into the positioning recess through the through hole.

According to one or more embodiments of the disclosure, in the foregoing wireless access point device, the fixing assembly includes an insertion pin, a spring, a location-limiting portion and a handle portion. The insertion pin is movably disposed on one side of the post, and one end of the insertion pin is used to insert into the positioning recess. The spring is sleeved on the insertion pin. The location-limiting portion positions the spring on the insertion pin. The handle portion is located out of the post and connected to the other end of the insertion pin for unplugging the insertion pin from the positioning recess.

According to one or more embodiments of the disclosure, in the foregoing wireless access point device, the handle portion includes a pressing rod, a fulcrum portion and a pivoting portion. The pressing rod includes a first end and a second end being opposite to the first end. The fulcrum portion is provided between the first end and the second end of the pressing rod to be in contact with the post. The pivoting portion is disposed on the first end of the pressing rod and pivotally connected to the insertion pin. When the second end of the pressing rod moves toward a first direction, the first end of the pressing rod unplugs the insertion pin from the positioning recess in a second direction that is opposite to the first direction by abutting the post with the fulcrum portion.

According to one or more embodiments of the disclosure, in the foregoing wireless access point device, the first connection portion is provided with a first positioning portion, and the second connection portion is provided with a second positioning portion. When the second connection portion is inserted into the slot, and the second positioning portion is engaged with the first positioning portion, the through hole of the casing is aligned with the positioning recess of the antenna module.

According to one or more embodiments of the disclosure, in the foregoing wireless access point device, the antenna module includes a mounting base. The mounting base is formed on the waveguide for installing a dish-shaped reflecting unit.

According to one or more embodiments of the disclosure, in the foregoing wireless access point device, the transmission assembly includes a reflective cover. The reflective cover is disposed within the internal space and fixed on the signal transceiving element.

According to one or more embodiments of the disclosure, in the foregoing wireless access point device, the positioning recess is a through hole or a blind hole.

In another embodiment of the disclosure, the wireless access point device includes a main frame, a signal transceiving element, a reflective cover, an antenna module, an insertion pin and a handle portion. The main frame includes a casing having an internal space, and a slot communicated with the internal space. The signal transceiving element is fixedly disposed within the internal space. The reflective cover is disposed within the internal space and fixed on the signal transceiving element. The antenna module includes a waveguide and a positioning recess. One end of the waveguide is detachably connected to the slot to be coupled to the signal transceiving element. The insertion pin is disposed in the slot and configured to fix the antenna module on the casing when inserted into the positioning recess. The handle portion is connected to the insertion pin for unplugging the insertion pin from the positioning recess.

In still another embodiment of the disclosure, the wireless access point device includes a main frame, a signal transceiving element, a reflective cover, an antenna module and an insertion pin. The main frame includes a front cover, a rear cover, a post and a slot. The front cover is formed with an opening, an outer surface and an inner surface. The opening penetrates through the outer surface and the inner surface. The rear cover is assembled to the front cover to collectively define an internal space therebetween. The post is protrudingly formed on the outer surface of the front cover. The slot is disposed on the post, communicated with the internal space through the opening. The signal transceiving element is disposed within the internal space to face towards the opening. The insertion pin is disposed on the post and pluggably disposed within the positioning recess, for fixing the antenna module on the front cover. The insertion pin is unplugged from the positioning recess such that the antenna module is separable from the main frame.

Thus, based on the embodiments above, the present disclosure not only facilitate time saving of maintaining or replacing antenna module for wireless access point device, but also reduce the risk fell from higher place and inconvenience of the maintaining or the replacing.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the disclosure and, together with the description, serve to explain the principles of the disclosure. In the drawings.

DETAILED DESCRIPTION

Figure 1:
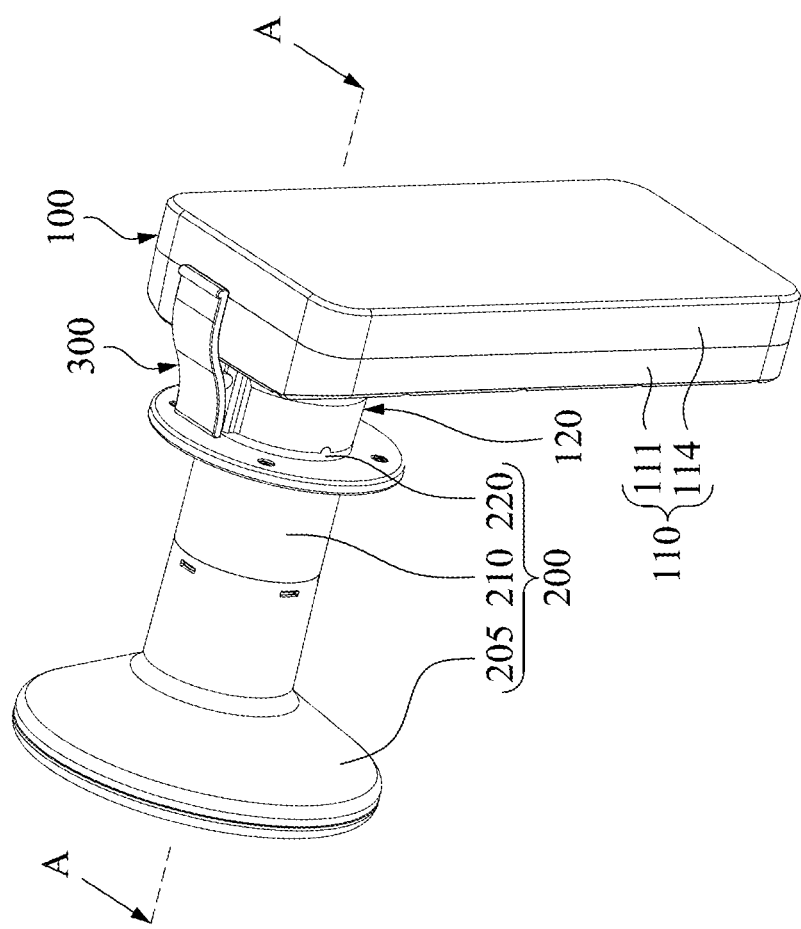
FIG. 1 is a perspective schematic view of a wireless access point device according to one embodiment of present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2A:
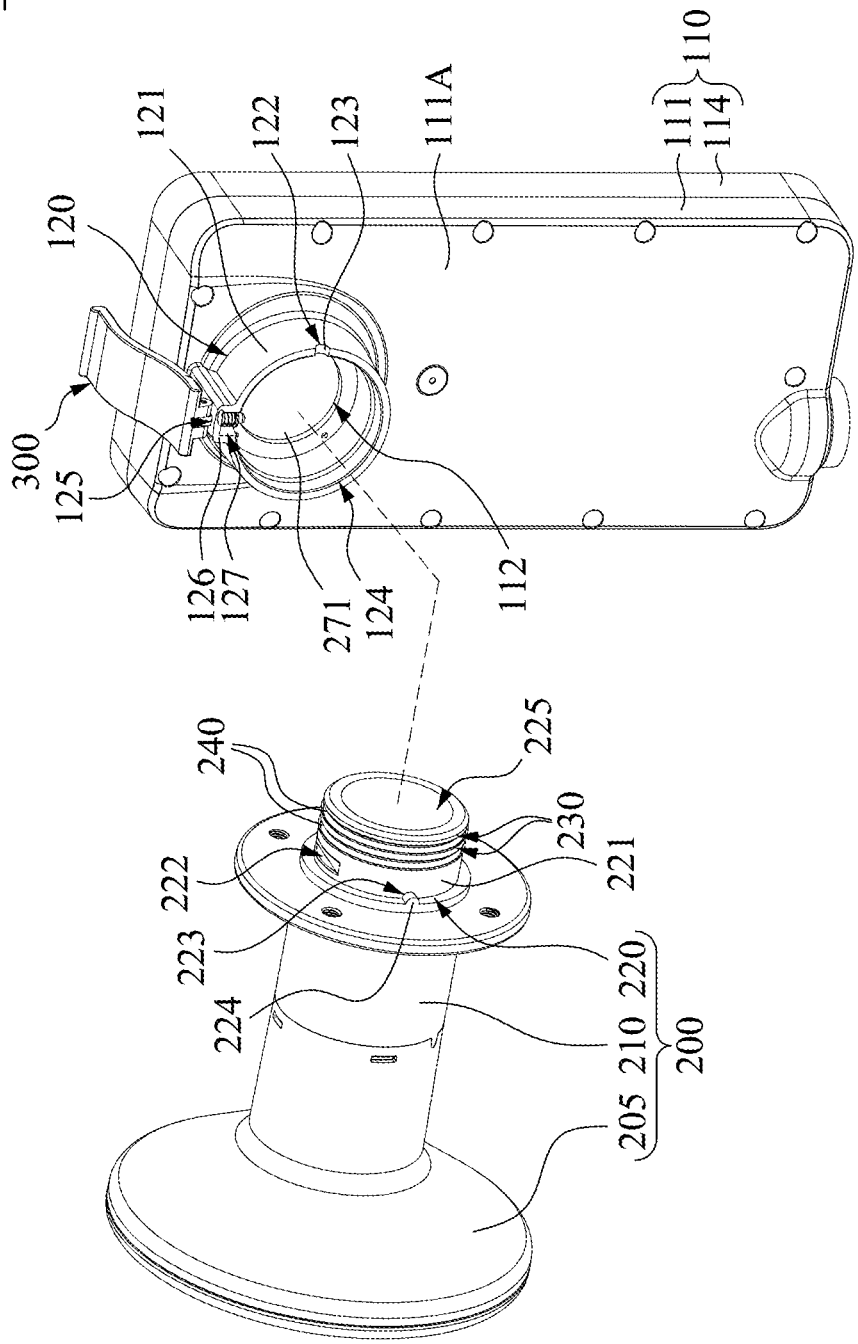
FIG. 2A is an exploded view of the antenna module and the casing of FIG. 1.
Figure 2B:
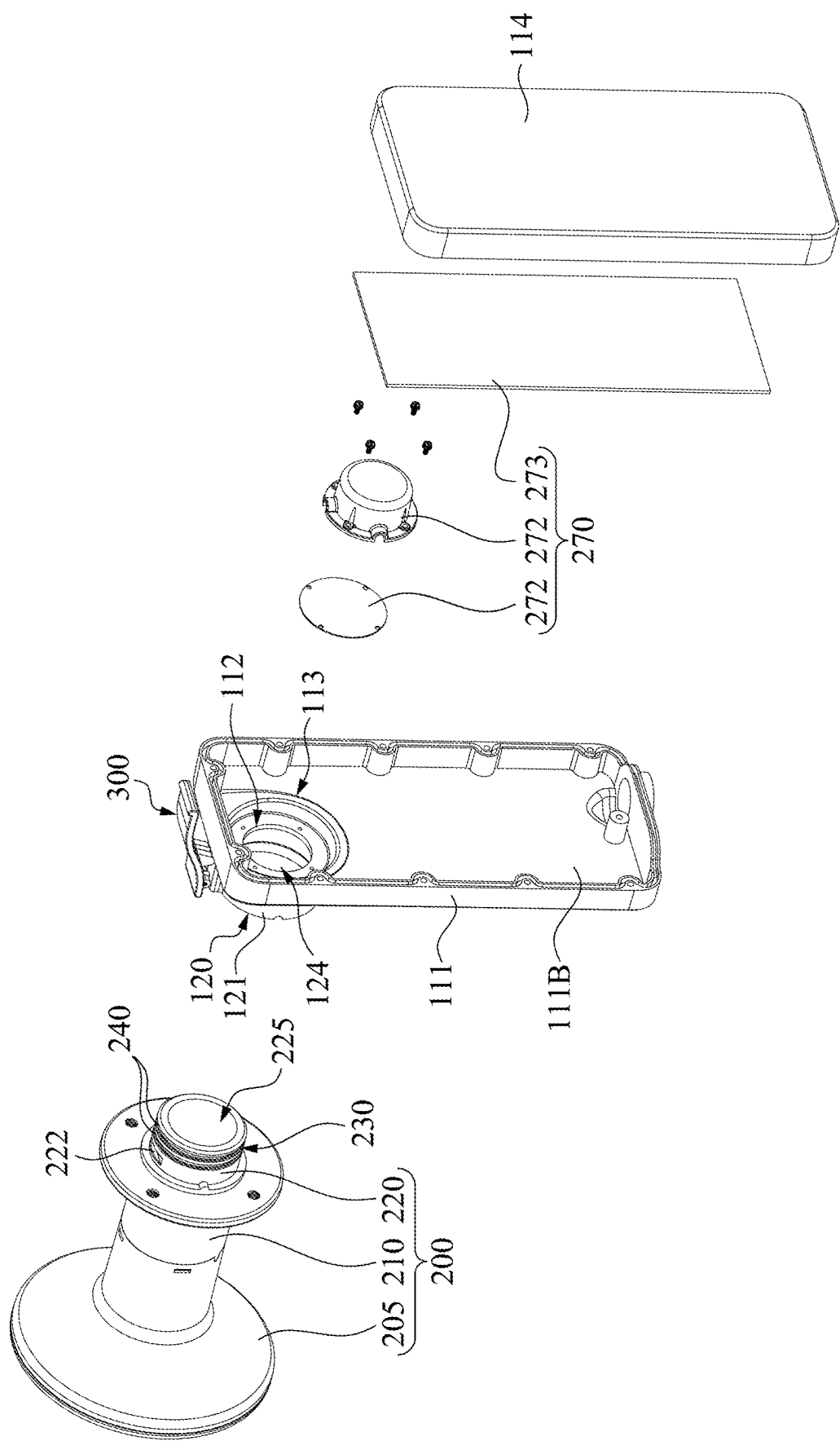
FIG. 2B is an exploded view of the casing of FIG. 1.

Reference is now made to FIG. 1 to FIG. 2B in which FIG. 1 is a perspective schematic view of a wireless access point device 10 according to one embodiment of present disclosure, FIG. 2A is an exploded view of the antenna module 200 and the casing 110 of FIG. 1, and FIG. 2B is an exploded view of the casing 110 of FIG. 1. As shown in FIG. 1 and FIG. 2A, in one embodiment, the wireless access point device 10 includes a main frame 100, an antenna module 200, a transmission assembly 270 and a fixing assembly 300.

Figure 3:
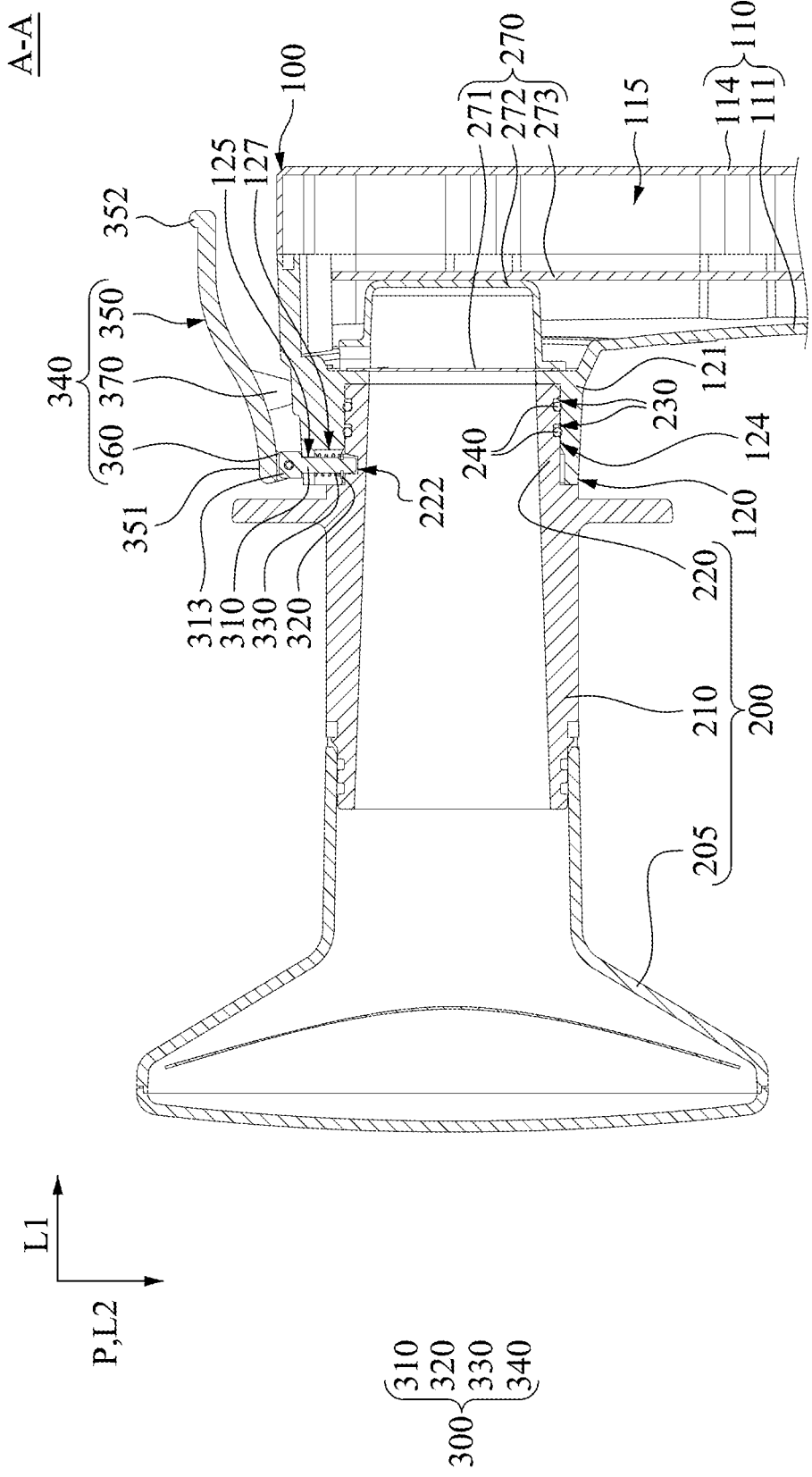
FIG. 3 is a partial cross-sectional view of the wireless access point device of FIG. 1 viewed along a line A-A.

FIG. 3 is a partial cross-sectional view of the wireless access point device 10 of FIG. 1 viewed along a line A-A. As shown in FIG. 2A and FIG. 3, the main frame 100 includes a casing 110 and a first connection portion 120. The casing 110 is formed with an opening 112 and an internal space 115 (FIG. 3). The internal space 115 is formed in the interior of the casing 110. The opening 112 is formed on a surface of the casing 110 and is in communication with the internal space 115. The first connection portion 120 is connected to the casing 110 and is in communication with the internal space 115 through the opening 112 of the casing 110. In the embodiment, the first connection portion 120 includes a slot 124. The slot 124 is in communication with the internal space 115 through the opening 112 of the casing 110. However, the disclosure is not limited thereto.

The antenna module 200 includes a sub-reflector 205 and a waveguide 210 (FIG. 3). The transmission assembly 270 is disposed inside the internal space 115 of the casing 110. One end of the waveguide 210 is connected to the sub-reflector 205, and one end of the waveguide 210 opposite to the sub-reflector 205 is provided with a second connection portion 220 having a positioning recess 222. In the present embodiment, the positioning recess 222 can be a blind hole, however, the positioning recess 222 is not limited to be a blind hole or a through hole. The second connection portion 220 is detachably connected to the first connection portion 120 and coupled to the signal transceiving element 271 through the opening 112 (FIG. 3) for transferring to and receiving signals from the transmission assembly 270. The fixing assembly 300 is movably disposed on the first connection portion 120, and the fixing assembly 300 removably inserts into the positioning recess 222 for fixing the antenna module 200 on the casing 110 so as to integrate the antenna module 200 and the main frame 100 together. In the present embodiment, the fixing assembly 300 can be a pin used to fix.

Furthermore, the antenna module 200 includes a mounting base 250 disposed on the waveguide 210 for loading an object such as a dish-shaped reflector. In present embodiment, the mounting base 250 is located on an outer surface of the waveguide 210 between the sub-reflector 205 and the second connection portion 220. The mounting base 250 surrounds the waveguide 210.

In this way, as shown in FIG. 1 and FIG. 2A, when the second connection portion 220 is connected to the first connection portion 120, for example, the second connection portion 220 inserts into the slot 124, and when the fixing assembly 300 inserts into the positioning recess 222 of the second connection portion 220, the antenna module 200 can be fixed on the casing 110 so as to be assembled on the main frame 100 to couple the transmission assembly 270 with the second connection portion 220 of the waveguide 210. On the contrary, when the fixing assembly 300 is unplugged from the positioning recess 222, the second connection portion 220 of the waveguide 210 can be detached from the first connection portion 120 of the main frame 100, thereby separating the antenna module 200 and the main frame 100.

As shown in FIG. 2B and FIG. 3, the casing 110 includes a front cover 111 and a rear cover 114. After the front cover 111 and the rear cover 114 are assembled to each other, an internal space 115 is defined between the front cover 111 and the rear cover 114. The front cover 111 is provided with an outer surface 111A and an inner surface 111B, which are opposite to each other. The outer surface 111A of the front cover 111 is an outer surface of the casing 110. The inner surface 111B is the surface of the front cover 111 facing towards the rear cover 114, and the inner surface 111B of the front cover 111 is formed with a sunken area 113 for positioning the transmission assembly 270.

The transmission assembly 270 includes a signal transceiving element 271, a reflective cover 272 and a processing circuit 273. The signal transceiving element 271 is disposed within the internal space 115, faces towards the slot 124 of the first connection portion 120 through the opening 112 and is coupled to the waveguide 210 for transmitting and receiving signals by the waveguide 210. The reflective cover 272 is disposed on the inner surface 111B of the front cover 111, covers the sunken area 113 and the signal transceiving element 271 so as to be collectively fixed on the casing 110 with the signal transceiving element 271. The reflective cover 272 is used to reflect electromagnetic waves excited by the signal transceiving element 271 towards the waveguide 210. The processing circuit 273 is disposed between the reflective cover 272 and the rear cover 114 and electrically connected to the signal transceiving element 271. The processing circuit 273 processes data to be transmitted or received and next transmits the data with electromagnetic waves by the antenna module 200, or receives other electromagnetic waves by the antenna module 200.

As shown in FIG. 2A and FIG. 3, in the embodiment, the first connection portion 120 includes a post 121 and a through hole 125. The post 121 is protrudingly formed on the outer surface 111A of the front cover 111. The post 121 is tubular in shape, and the post 121 is protrudingly formed on one surface of the casing 110, that is, the post 121 protrudes from the outer surface 111A of the front cover 111. The slot 124 is formed on one end surface of the post 121 facing away from the casing 110, and the slot 124 is connected to the internal space 115 through the opening 112 of the casing 110 such that the second connection portion 220 is allowed to insert into the slot 124. The second connection portion 220 is tubular in shape, and one end surface of the second connection portion 220 facing towards the signal transceiving element 271 is formed with a hollow channel 225. The through hole 125 penetrates through the post 121 at one side of the post 121 to be in communication with the slot 124, thus, the fixing assembly 300 can insert into the positioning recess 222 via the through hole 125. An axis direction P of the through hole 125 intersects a longitudinal direction L1 of the slot 124 (FIG. 3). In the embodiment, the axis direction P of the through hole 125 and the longitudinal axis direction L1 of the slot 124 are orthogonal to each other (FIG. 3).

As shown in FIG. 2A and FIG. 3, the post 121 is formed with a raised portion 126 at one side thereof. The raised portion 126 is formed with an accommodating space 127 being in communication with the slot 124. The through hole 125 is formed on the raised portion 126 such that the accommodating space 127 is arranged between the through hole 125 and the slot 124 so as to be communicated with the through hole 125 and the slot 124, respectively. Thus, the fixing assembly 300 is allowed to insert into the positioning recess 222 through the through hole 125 and the accommodating space 127 for the antenna module 200 to be fixed on the casing 110.

Furthermore, the first connection portion 120 is provided with a first positioning portion 122, and the second connection portion 220 is provided with a second positioning portion 223 corresponding to the first positioning portion 122. The shape of the second positioning portion 223 and the shape of the first positioning portion 122 are complementary to each other so that the second positioning portion 223 and the first positioning portion 122 are allowed to be engaged with each other. For example, the first positioning portion 122 can be a concave arc portion 123, and the second positioning portion 223 can be a convex arc portion 224. The outline of the concave arc portion 123 and the outline of the convex arc portion 224 are complementary to each other, so that the convex arc portion 224 is allowed to be engaged with the concave arc portion 123. However, the present disclosure is not limited that the second positioning portion and the first positioning portion have to be complementary to each other in shape.

Therefore, when the second connection portion 220 is inserted into the slot 124 to make the second positioning portion 223 and the first positioning portion 122 being engaged with each other, the through hole 125 of the casing 110 can be coaxially aligned with the positioning recess 222 of the antenna module 200 for the fixing assembly 300 to correctly insert into the positioning recess 222 (FIG. 3).

Furthermore, as shown in FIG. 2A and FIG. 3, the antenna module 200 includes one or more (e.g., two) trenches 230 and one or more (e.g., two) elastic rings 240. These trenches 230 are formed and spaced arranged on the outer surface 221 of the second connection portion 220. Each of the elastic rings 240 is located within one of the trenches 230 to tightly sleeve on the second connection portion 220. The material of the elastic ring 240 is, for example, rubber, plastic, or other waterproof material, and the trench 230 is in, for example, a ring or an arc shape. However, the present disclosure is not limited thereto.

Thus, when the second connection portion 220 inserts into the slot 124, since each of the elastic rings 240 is squeezed between the second connection portion 220 and the post 121, the elastic ring 240 is closely abutted between the second connection portion 220 and post 121 (i.e., the inner surface of the slot 124), thereby reducing the possibility of water vapor entering the casing 110 through the slot 124.

Figure 4:
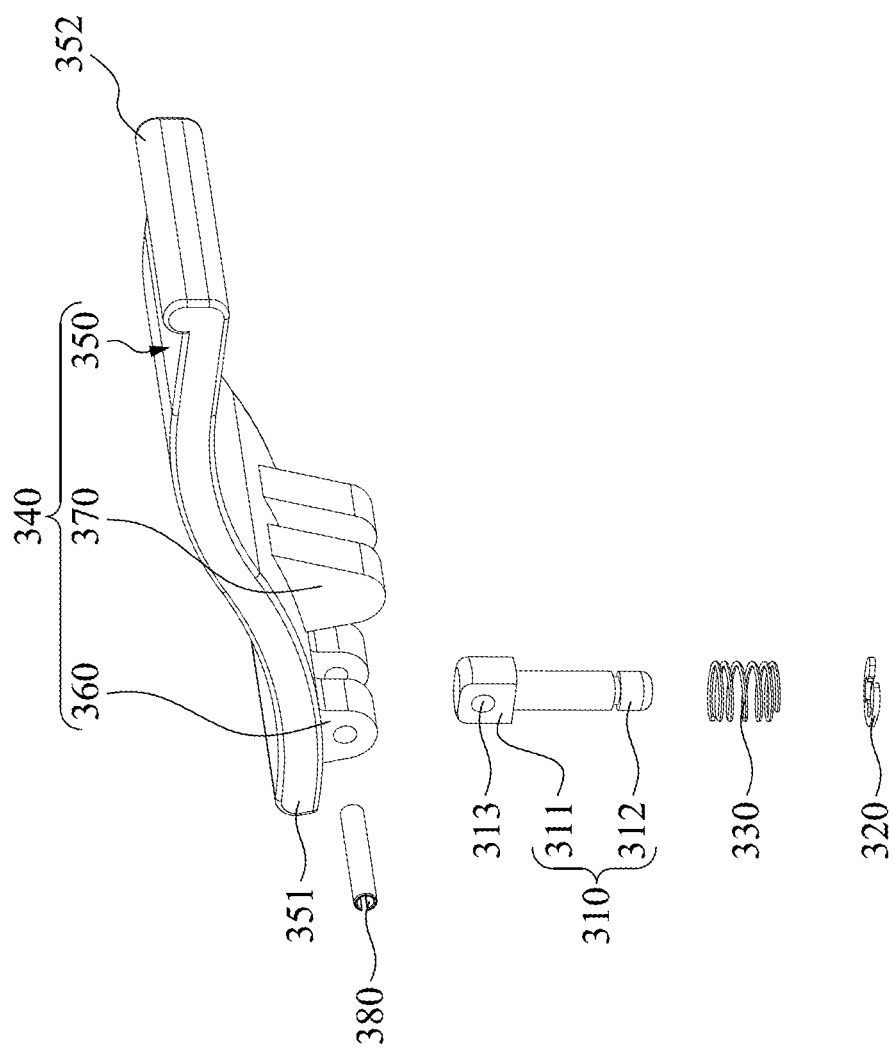
FIG. 4 is an exploded view of the fixing assembly of FIG. 1.
Figure 5:
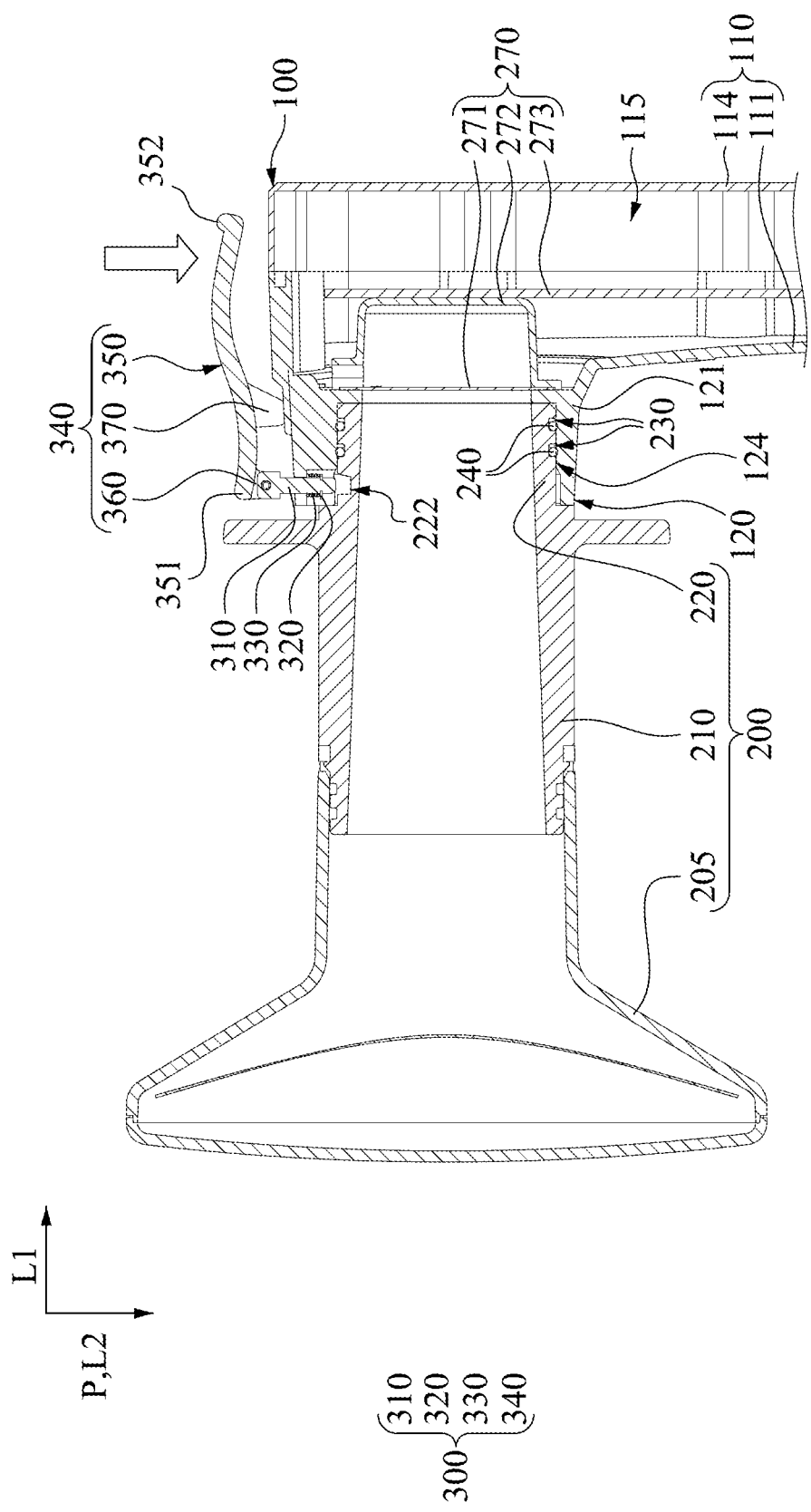
FIG. 5 is an operational schematic view of the fixing assembly of FIG. 1.

FIG. 4 is an exploded view of the fixing assembly of FIG. 1. FIG. 5 is an operational schematic view of the fixing assembly of FIG. 1. More specifically, as shown in FIG. 4 and FIG. 5, the fixing assembly 300 includes an insertion pin 310, a location-limiting portion 320, a spring 330 and a handle portion 340. The insertion pin 310 is movably disposed on the raised portion 126. The longitudinal direction L2 of the insertion pin 310 intersects the longitudinal direction L1 of the slot 124.

For example, the longitudinal direction L2 of the insertion pin 310 is orthogonal to the longitudinal direction L1 of the slot 124 so that the insertion pin 310 is allowed to be linearly moved on the raised portion 126 towards the longitudinal direction L2.

The insertion pin 310 includes a first portion 311 and a second portion 312, which are connected to each other and integrally formed (FIG. 4). The first portion 311 is provided with a pivot portion 313, and the pivot portion 313 is protruded out of the raised portion 126. The second portion 312 is located within the through hole 125, the accommodating space 127 and the slot 124 for inserting into the positioning recess 222. The spring 330 is sleeved on the insertion pin 310 in the accommodating space 127 so as to abut the location-limiting portion 320 and the raised portion 126, respectively. The location-limiting portion 320 is disposed within the accommodating space 127 to constrain the spring 330 on the insertion pin 310 between the location-limiting portion 320 and the raised portion 126. The location-limiting portion 320 can be a C-shaped buckle or other limiting elements, however, the disclosure is not limited thereto. The handle portion 340 is located out of the raised portion 126 to connect to the first portion 311 of the insertion pin 310 for unplugging the second portion 312 of the insertion pin 310 from the slot 124. Thus, a user is able to pull the insertion pin 310 away from the positioning recess 222 through the handle portion 340 and then pull the antenna module 200 out of the slot 124 of the casing 110, thereby replacing or assembling the antenna module 200 to the wireless access point device 10.

The handle portion includes a pressing rod 350, a pivoting portion 360 and a fulcrum portion 370. The pressing rod 350 is provided with a first end 351 and a second end 352 being opposite to each other. The pivoting portion 360 is disposed on the first end 351 of the pressing rod 350, and the pivoting portion 360 is pivotally connected to the pivot portion 313 of the insertion pin 310 through a pivot 380. The fulcrum portion 370 is provided between the first end 351 and the second end 352 of the pressing rod 350 to be in contact with the surface of the post 121. However, the disclosure is not limited to the handle portion 340 move the insertion pin 310 using the principle of lever only.

Therefore, when the user presses the second end 352 of the pressing rod 350 downwardly by abutting the surface of the post 121 with the fulcrum portion 370, the first end 351 of the pressing rod 350 is reversely risen to unplug the second portion 312 of the insertion pin 310 upwardly from the positioning recess 222 and to press the spring 330. Therefore, the user can unplug the antenna module 200 from the slot 124 of the casing 110 to replace or assemble the antenna module 200. Conversely, when the user lets go, the pressed spring 330 returns the insertion pin 310 back to the original position of the insertion pin 310.

Figure 6:
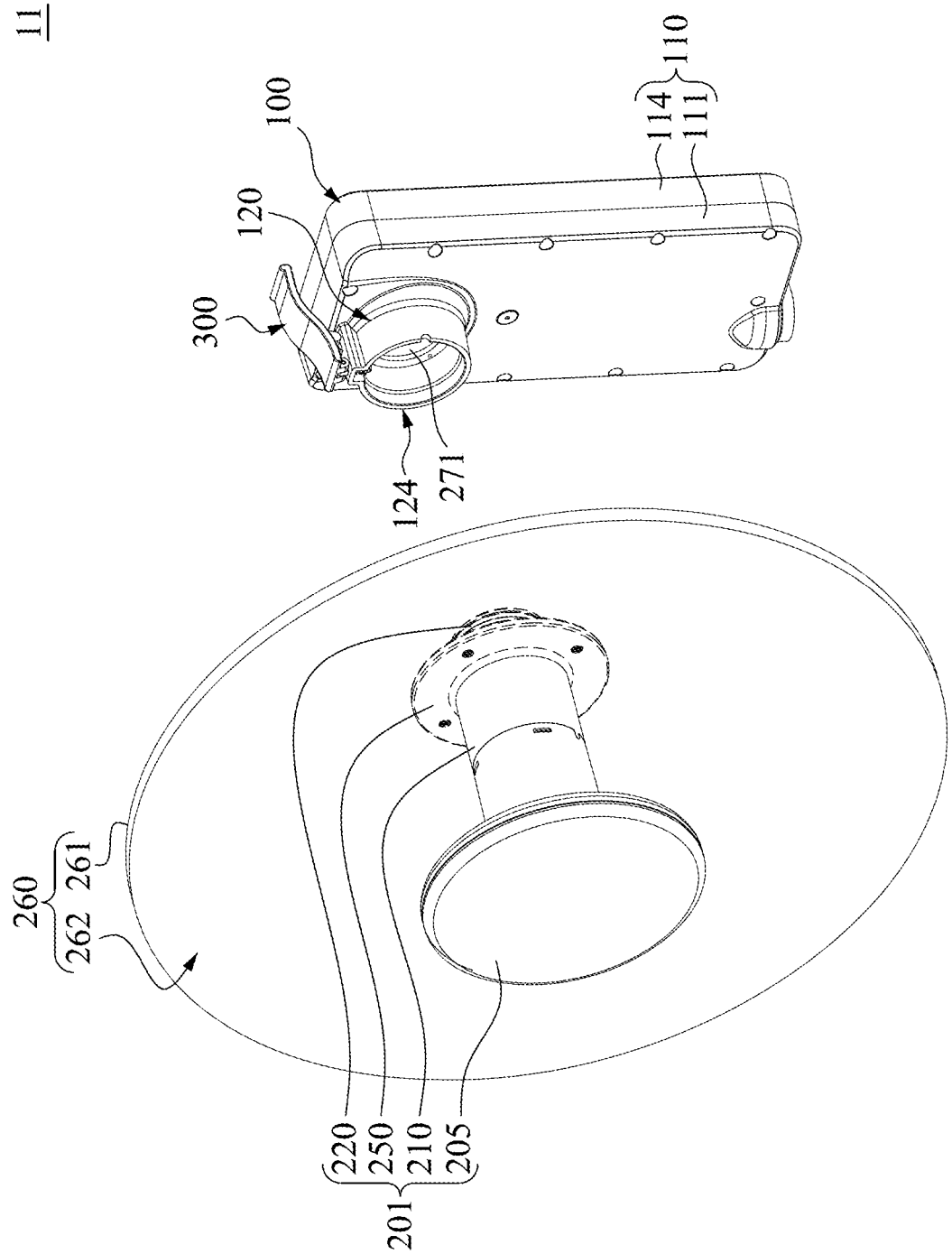
FIG. 6 is an exploded view of a wireless access point device according to one embodiment of present disclosure.

FIG. 6 is an exploded view of a wireless access point device 11 according to one embodiment of present disclosure. As shown in FIG. 2A and FIG. 6, the wireless access point device 11 is substantially the same as the wireless access point device 10 described above, but one of the differences is that the antenna module 201 further includes a dish-type reflecting unit 260. The dish-type reflecting unit 260 is mounted on the mounting base 250 of the waveguide 210. The dish-type reflecting unit 260 includes a dish body 261 and a parabolic concave surface 262. The dish body 261 is screwedly fixed on one surface of the mounting base 250 opposite to the casing 110, and the dish body 261 surrounds the waveguide 210. The parabolic concave surface 262 is located on a side of the dish body 261 facing away from the casing 110 for reflecting and strengthening the signals of the antenna module 201.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wireless access point device, comprising:
   a main frame which comprises a casing having an internal space and a first connection portion, wherein the first connection portion is connected to the casing and communicated with the internal space;
   a transmission assembly disposed in the internal space and provided with a signal transceiving element;
   an antenna module comprising a waveguide, a second connection portion and a positioning recess, wherein the second connection portion is disposed on one end of the waveguide and detachably connected to the first connection portion to be coupled to the signal transceiving element, and the positioning recess is formed on the second connection portion; and
   a fixing assembly movably disposed on the first connection portion,
   wherein the antenna module is thereby fixed on the casing when the second connection portion and the first connection portion are fixed together through the fixing assembly removably inserting into the positioning recess.

2. The wireless access point device of claim 1, wherein the first connection portion comprises:
   a slot configured for being inserted by the second connection portion, wherein the slot is in communication with the internal space.

3. The wireless access point device of claim 2, wherein the first connection portion comprises:
   a post protrudingly formed on an outer surface of the casing, wherein the slot is formed on one end of the post facing away from the casing; and
   a through hole formed on one side of the post and communicated with the slot,
   wherein an longitudinal direction of the through hole intersects a longitudinal direction of the slot, and the fixing assembly is inserted into the positioning recess through the through hole.

4. The wireless access point device of claim 3, wherein the fixing assembly comprises:
   an insertion pin movably disposed on one side of the post, and one end of the insertion pin is used to insert into the positioning recess;
   a spring sleeved on the insertion pin;
   a location-limiting portion for positioning the spring on the insertion pin; and
   a handle portion located out of the post and connected to the other end of the insertion pin for unplugging the insertion pin from the positioning recess.

5. The wireless access point device of claim 4, wherein the handle portion comprises:
   a pressing rod having a first end and a second end being opposite to the first end;
   a fulcrum portion provided between the first end and the second end of the pressing rod and being in contact with the post; and
   a pivoting portion disposed on the first end of the pressing rod and pivotally connected to the insertion pin,
   wherein when the second end of the pressing rod moves toward a first direction, the first end of the pressing rod unplugs the insertion pin from the positioning recess in a second direction by abutting the post with the fulcrum portion, and the second direction is opposite to the first direction.

6. The wireless access point device of claim 3, wherein the first connection portion is provided with a first positioning portion, and the second connection portion is provided with a second positioning portion, wherein the through hole of the casing is aligned with the positioning recess of the antenna module when the second connection portion is inserted into the slot, and the second positioning portion is engaged with the first positioning portion.

7. The wireless access point device of claim 1, wherein the antenna module comprises:
a mounting base formed on the waveguide for installing a dish-shaped reflecting unit.

8. The wireless access point device of claim 1, wherein the transmission assembly comprises a reflective cover disposed within the internal space and fixed on the signal transceiving element.

9. The wireless access point device of claim 1, wherein the positioning recess is a through hole or a blind hole.

10. A wireless access point device, comprising:
a main frame comprising a casing having an internal space and a slot communicated with the internal space;
a signal transceiving element fixedly disposed within the internal space;
a reflective cover disposed within the internal space and fixed on the signal transceiving element;
an antenna module comprising a waveguide and a positioning recess, wherein one end of the waveguide is detachably connected to the slot to be coupled to the signal transceiving element;
an insertion pin disposed in the slot and configured to fix the antenna module on the casing when inserted into the positioning recess; and
a handle portion connected to the insertion pin for unplugging the insertion pin from the positioning recess.

11. The wireless access point device of claim 10, wherein the main frame comprises:
a post protrudingly formed on an outer surface of the casing, wherein the slot is formed on one end of the post facing away from the casing; and
a through hole formed on one side of the post and communicated with the slot,
wherein the insertion pin is removably disposed in the through hole and the positioning recess, and an longitudinal direction of the through hole intersects a longitudinal direction of the slot.

12. The wireless access point device of claim 11, further comprising:
a spring sleeved on the insertion pin; and
a location-limiting portion for positioning the spring on the insertion pin, wherein the spring is pressed by the location-limiting portion and the post when the insertion pin is unplugged from the positioning recess by the handle portion, and the spring returns the insertion pin back to original position when the insertion pin is no longer pulled by the handle portion.

13. The wireless access point device of claim 10, wherein the handle portion comprises:
a pressing rod having a first end and a second end being opposite to the first end;
a fulcrum portion provided between the first end and the second end of the pressing rod to be in contact with the post; and
a pivoting portion disposed on the first end of the pressing rod and pivotally connected to the insertion pin,
wherein the first end of the pressing rod unplugs the insertion pin from the positioning recess in a second direction by abutting the post with the fulcrum portion when the second end of the pressing rod moves toward a first direction, and the second direction is opposite to the first direction.

14. The wireless access point device of claim 10, wherein the antenna module comprises:
a mounting base formed on the waveguide for installing a dish-shaped reflecting unit.

15. A wireless access point device, comprising:
a main frame comprising:
a front cover formed with an opening, an outer surface, an inner surface, and the opening penetrating through the outer surface and the inner surface;
a rear cover assembled to the front cover to collectively define an internal space therebetween;
a post protrudingly formed on the outer surface of the front cover; and
a slot disposed on the post and communicated with the internal space through the opening;
a signal transceiving element disposed within the internal space to face towards the opening;
a reflective cover disposed within the internal space and fixed on the signal transceiving element;
an antenna module comprising a waveguide and a positioning recess, wherein one end of the waveguide is detachably connected to the slot to be coupled to the signal transceiving element through the opening; and
an insertion pin disposed on the post and pluggably disposed within the positioning recess, for fixing the antenna module on the front cover,
wherein the insertion pin is unplugged from the positioning recess such that the antenna module is separable from the main frame.

16. The wireless access point device of claim 15, further comprising:
a spring sleeved on the insertion pin;
a location-limiting portion for positioning the spring on the insertion pin; and
a handle portion located out of the post and connected to one end of the insertion pin facing away from the positioning recess for unplugging the insertion pin from the positioning recess.

17. The wireless access point device of claim 16, wherein the handle portion comprises:
a pressing rod having a first end and a second end being opposite to each other;
a fulcrum portion provided between the first end and the second end of the pressing rod to be in contact with the post; and
a pivoting portion disposed on the first end of the pressing rod and pivotally connected to the insertion pin,
wherein when the second end of the pressing rod moves in a first direction, the first end of the pressing rod unplugs the insertion pin from the positioning recess in a second direction by pressing the post with the fulcrum portion, and the second direction is opposite to the first direction.

18. The wireless access point device of claim 15, wherein the antenna module comprises:
a mounting base formed on the waveguide for installing a dish-shaped reflecting unit.

* * * * *